US009806351B2

United States Patent
Shibuya

(10) Patent No.: US 9,806,351 B2
(45) Date of Patent: *Oct. 31, 2017

(54) MATERIAL FUEL CELL SEPARATOR, FUEL CELL SEPARATOR USING SAME, FUEL CELL STACK, AND METHOD OF PRODUCING FUEL CELL SEPARATOR MATERIAL

(75) Inventor: Yoshitaka Shibuya, Ibaraki (JP)

(73) Assignee: JX Nippon Mining & Metals Corporation, Tokyo (JP)

(*) Notice: Subject to any disclaimer, the term of this patent is extended or adjusted under 35 U.S.C. 154(b) by 333 days.

This patent is subject to a terminal disclaimer.

(21) Appl. No.: 14/237,673

(22) PCT Filed: Aug. 9, 2011

(86) PCT No.: PCT/JP2011/068166
§ 371 (c)(1),
(2), (4) Date: May 7, 2014

(87) PCT Pub. No.: WO2013/021465
PCT Pub. Date: Feb. 14, 2013

(65) Prior Publication Data
US 2014/0295322 A1 Oct. 2, 2014

(51) Int. Cl.
H01M 8/24 (2016.01)
H01M 8/0208 (2016.01)
H01M 8/0228 (2016.01)

(52) U.S. Cl.
CPC ....... H01M 8/0208 (2013.01); H01M 8/0228 (2013.01)

(58) Field of Classification Search
CPC .................... H01M 8/0208; H01M 8/0228
See application file for complete search history.

(56) References Cited

U.S. PATENT DOCUMENTS 5,942,350 A 8/1999 Roy et al.
6,893,765 B1 5/2005 Nishida et al.
(Continued)

FOREIGN PATENT DOCUMENTS

CN 101599542 12/2009
JP 2001-514705 9/2001
(Continued)

OTHER PUBLICATIONS

Interview Summary corresponding to U.S. Appl. No. 13/131,499 dated Mar. 17, 2015.
(Continued)

Primary Examiner — Nicholas P D'Aniello
(74) Attorney, Agent, or Firm — Jenkins, Wilson, Taylor & Hunt

(57) ABSTRACT

A material for fuel cell separator, wherein a surface layer 6 containing Au and Cr is formed on a surface of a Ti base 2, and an intermediate layer 2a containing Ti, O, Cr, and less than 20 atomic % of Au is present between the Ti base and the surface layer, a thickness of an area containing 65 atomic % or more of Au being 1.5 nm or more, a maximum concentration of Au being 80 atomic % or more, a coating amount of Au being 9000 to 40000 ng/cm$^2$, a ratio represented by (Au coating amount)/(Cr coating amount) being 10 or more, a coating amount of Cr being 200 ng/cm$^2$ or more, and in the intermediate layer having an area containing 10% or more of Ti, 10% or more of O and 20% or more of Cr being 1 nm or more.

11 Claims, 4 Drawing Sheets

(56) References Cited

U.S. PATENT DOCUMENTS

| | | |
|---|---|---|
| 9,123,920 B2 | 9/2015 | Shibuya |
| 2004/0170881 A1 | 9/2004 | Nakata |
| 2005/0158607 A1 | 7/2005 | Vyas et al. |
| 2006/0134501 A1 | 6/2006 | Lee et al. |
| 2008/0107928 A1 | 5/2008 | Kikui |
| 2009/0297918 A1 | 12/2009 | Sasaoka et al. |
| 2011/0262825 A1 | 10/2011 | Shibuya |
| 2012/0009496 A1 | 1/2012 | Shibuya |
| 2012/0202133 A1 | 8/2012 | Shibuya et al. |
| 2013/0244129 A1 | 9/2013 | Shibuya et al. |

FOREIGN PATENT DOCUMENTS

| | | |
|---|---|---|
| JP | 2001-297777 | 10/2001 |
| JP | 2002-367434 | 12/2002 |
| JP | 2004-185998 | 7/2004 |
| JP | 2004-296381 | 10/2004 |
| JP | 2005-243401 | 9/2005 |
| JP | 2007-059375 | 3/2007 |
| JP | 2008-153082 | 7/2008 |
| JP | 2008-210773 | 9/2008 |
| JP | 2009-295343 | 12/2009 |
| JP | 2010-238577 | 10/2010 |
| JP | 2011-76847 | 4/2011 |
| WO | WO01/22513 | 3/2001 |
| WO | WO2006/028184 | 3/2006 |
| WO | WO2006/082734 | 8/2006 |
| WO | WO2010/061694 | 6/2010 |
| WO | WO2010/071068 | 6/2010 |
| WO | WO 2013/021465 | 2/2013 |

OTHER PUBLICATIONS

Interview Summary corresponding to U.S. Appl. No. 13/139,237 dated Mar. 26, 2015.
Notice of Allowance corresponding to U.S. Appl. No. 13/131,499 dated Apr. 30, 2015.
Official Action corresponding to U.S. Appl. No. 13/131,499 dated Dec. 26, 2014.
Official Action corresponding to U.S. Appl. No. 13/139,237 dated Jun. 4, 2015.
Advisory Action corresponding to U.S. Appl. No. 13/131,499 dated Jul. 9, 2014.
Advisory Action corresponding to U.S. Appl. No. 13/139,237 dated Jul. 1, 2014.
International Search Report corresponding to International Patent Application No. PCT/JP2009/067882 dated Jan. 19, 2010.
International Search Report corresponding to International Patent Application No. PCT/JP2009/070648 dated Mar. 23, 2010.
Notification of Transmittal of Translation of the International Preliminary Report on Patentability (Chapter I or Chapter II) corresponding to International Patent Application No. PCT/JP2009/067882 dated Jul. 14, 2011.
Notification of Transmittal of Translation of the International Preliminary Report on Patentability (Chapter I or Chapter II) corresponding to International Patent Application No. PCT/JP2009/070648 dated Jul. 14, 2011.
Official Action corresponding to U.S. Appl. No. 13/139,237 dated Jul. 18, 2013.
Official Action corresponding to U.S. Appl. No. 13/131,499 dated Dec. 17, 2013.
Official Action corresponding to U.S. Appl. No. 13/139,237 dated Mar. 12, 2014.
Official Action corresponding to U.S. Appl. No. 13/131,499 dated Apr. 1, 2014.
Official Action corresponding to U.S. Appl. No. 13/139,237 dated Nov. 26, 2014.
International Search Report corresponding to International Application No. PCT/JP2011/068166 dated Oct. 18, 2011.
Notification of Transmittal of Translation of the International Preliminary Report on Patentibility corresponding to International Application No. PCT/JP2011/068166 dated Feb. 20, 2014.

[Fig. 1]
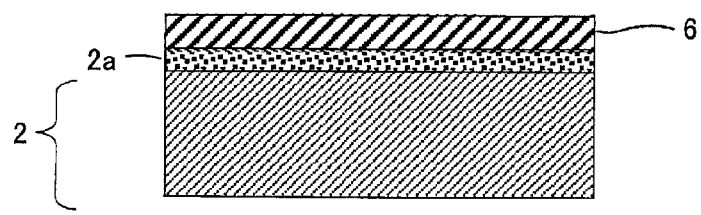
[Fig. 2]
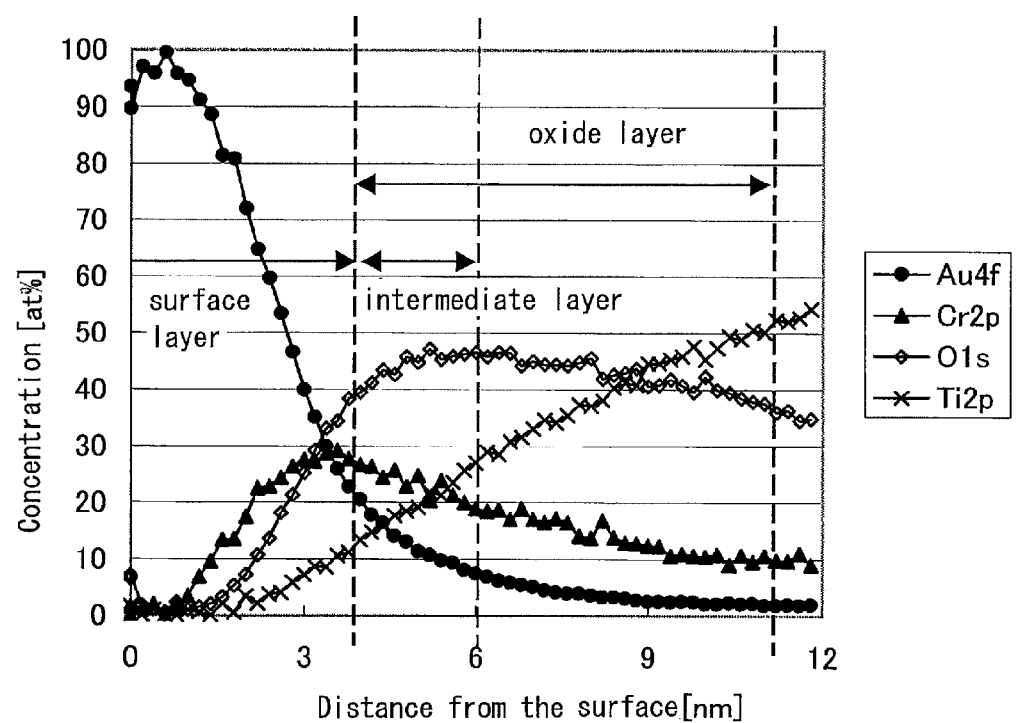

[Fig. 3]
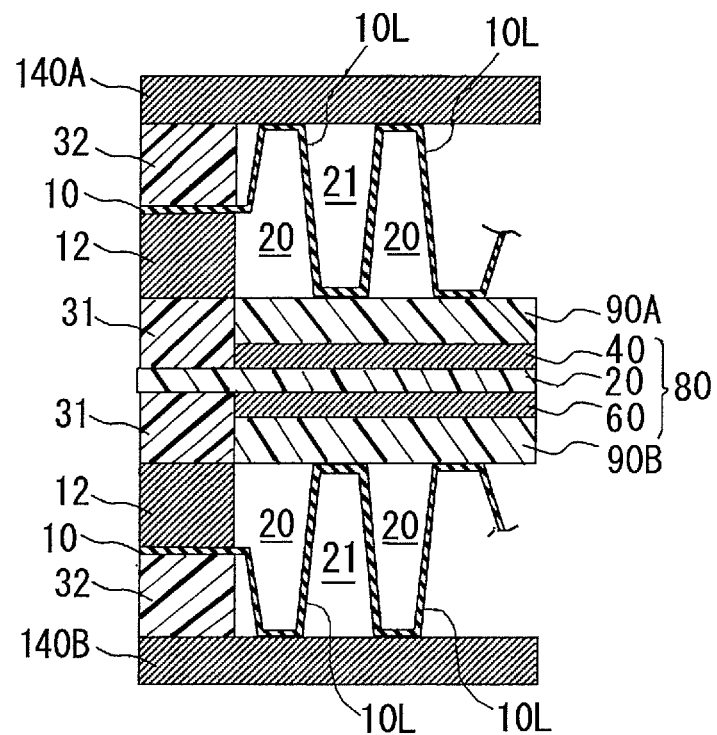
[Fig. 4]
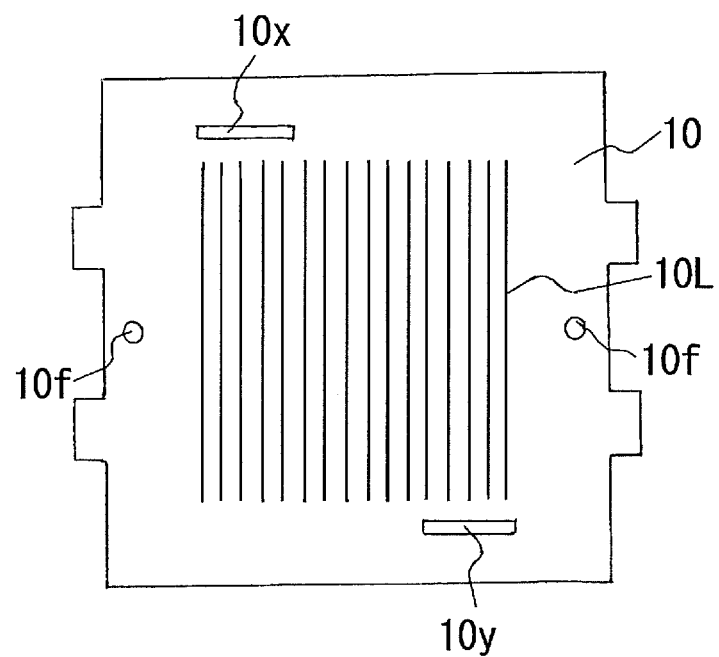

[Fig. 5]
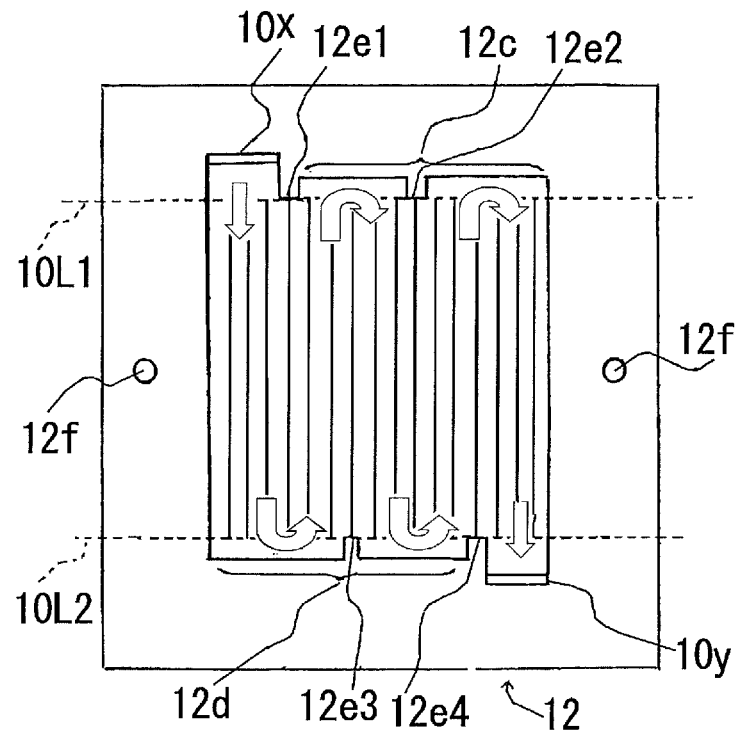
[Fig. 6]
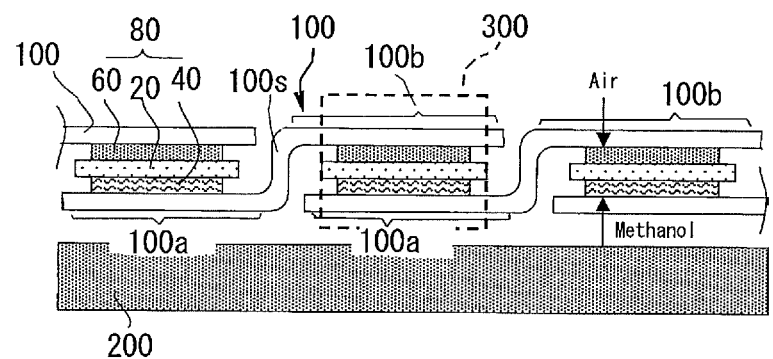

[Fig. 7]
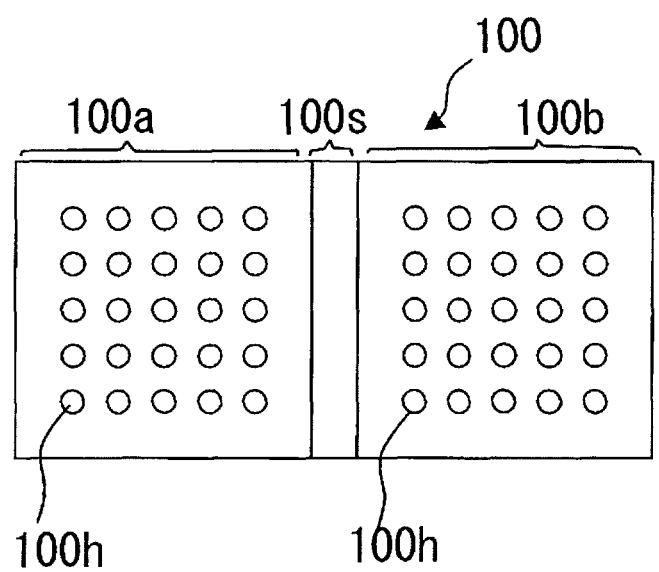

MATERIAL FUEL CELL SEPARATOR, FUEL CELL SEPARATOR USING SAME, FUEL CELL STACK, AND METHOD OF PRODUCING FUEL CELL SEPARATOR MATERIAL

FIELD OF THE INVENTION

The present invention relates to a material for fuel cell separator on which Au or an Au alloy (a layer containing Au) is formed, a fuel cell separator using the same and a fuel cell stack.

DESCRIPTION OF THE RELATED ART

Traditionally, as a polymer electrolyte fuel cell separator, a carbon plate on which gas flow paths are formed has been used. However, it is undesirable in that material costs and processing costs are high. On the other hand, when a metal plate is used in place of the carbon plate, it might undesirably be corroded and eluted at high temperature under oxidizing atmosphere. To avoid this, there is a known technology that an alloy of Au and a noble metal selected from Au, Ru, Rh, Pd, Os, Ir, Pt or the like is sputtered on a Ti plate to form an electrical conductive portion (see Patent Literature 1). In addition, Patent Literature 1 describes that the oxide of the aforementioned noble metal is formed on a Ti surface.

Meanwhile, it is known that a fuel cell separator is produced by forming an Au layer on an oxide layer of a Ti base via an intermediate layer comprising Ti, Zr, Hf, V, Nb, Ta, Cr, Mo, W or the like (see Patent Literature 2). The intermediate layer is said to have good adhesion property with a base oxide layer, i.e., good binding property with O (oxygen atoms) and have good adhesion and binding properties with an Au layer, since the intermediate layer is metal or half-metal.

As the polymer electrolyte fuel cell, a direct methanol fuel cell (DMFC) using methanol, which is easily handled, as a fuel gas to be fed to an anode has also been developed. Since the DMFC can take energy (electricity) directly from methanol, no reformer is needed, and a small-sized fuel cell can be produced, the DMFC is also expected as a power supply of mobile devices.

Two structures of the DMFC are proposed: A first structure is a layered type (active type) structure that single cells (membrane electrode assemblies (herein referred to as MEAs) each of which is composed of a polymer electrolyte membrane sandwiched between a fuel electrode and an oxygen electrode) are layered. A second structure is a flat type (passive type) structure that a plurality of single cells are disposed in a planar direction. In these structures, a plurality of single cells are connected in series (herein referred to as a stack). Since the passive type structure requires no active fuel transport means for providing a fuel gas (fuel liquid) or air to the cell, the smaller-sized fuel cell may be expected (see Patent Literature 3).

The fuel cell separator has electrical conductivity, connects each single cell electrically, collects energy (electricity) produced on each single cell, and has flow paths for fuel gas (fuel liquid) or air (oxygen) that are provided to each single cell. The separator is also referred to as an interconnector, a bipolar plate or a current collector.

There are many conditions required for the current collector of the DMFC as compared with those required for the polymer electrolyte fuel cell separator using hydrogen gas. Specifically, in addition to the corrosion resistance against a sulfuric acid solution required for the normal polymer electrolyte fuel cell, the corrosion resistance against a methanol fuel solution and a formic acid solution is required. The formic acid is a by-product produced when hydrogen ions are produced from methanol on an anode catalyst.

In addition, when chlorine (for example, derived from NaCl) enters into a fuel methanol solution, a corrosion resistance of the fuel cell separator becomes significantly poor. It is therefore require the corrosion resistance of the fuel cell separator in the chlorine containing solution.

Suppose the polymer electrolyte fuel cell and the direct methanol fuel cell are used seashore, fuel air has a relatively high chlorine content. The chlorine enters into the fuel cell, the cells may be significantly deteriorated by chlorine depending on the metal used for the separator material. Therefore, a corrosion resistance test in a corrosion liquid containing chlorine is needed, and has great significance (the fuel cell separator needs the corrosion resistance in the chlorine containing solution).

As described above, the materials that are used for the conventional polymer electrolyte fuel cell separator are not always applicable to the DMFC under the DMFC operable conditions.

PRIOR ART LITERATURE

Patent Literature

[Patent Literature 1] Unexamined Japanese Patent Publication (Kokai) 2001-297777
[Patent Literature 2] Unexamined Japanese Patent Publication (Kokai) 2004-185998
[Patent Literature 3] Unexamined Japanese Patent Publication (Kokai) 2005-243401

Problems to be Solved by the Invention

In the technology described in Patent Literature 1 mentioned above, to provide the Au alloy layer having good adhesion, the oxide layer on the surface of the titanium base is required to be removed. If the oxide film is removed insufficiently, the adhesion of the noble metal layer is decreased.

Patent Literature 2 describes the formation of the electrically conductive thin layer on the surface of the oxide film above the surface of the base. If Au, for example, is formed while leaving the oxide film on the surface of the titanium base, the Au layer is formed uneven. In particular, in the wet gold plating, the shape of the electrodeposited plating is granular. When the oxide film remains on the surface of the titanium base, there may be a non-plated portion on a part of the surface of the titanium base. Patent Literature 2 describes that the intermediate layer containing Cr is provided to improve the adhesion property. When a coated amount of Cr is too high, however, a corrosion resistance of the fuel cell separator becomes poor in the chlorine containing solution.

The technology described in Patent Literature 3 is that resin is coated on the base obtained by cladding stainless on both surface of a copper plate, which may not have good corrosion resistance.

Accordingly, the present invention is made to solve the problems described above. The object of the present invention is to provide a material for fuel cell separator; a fuel cell separator using the same; and a fuel cell stack that can form, on a surface of a titanium base, an electrically conductive layer containing Au having high corrosion resistance, high adhesion property, and high durability under the operating conditions of a fuel cell in a chlorine containing solution.

SUMMARY OF THE INVENTION

Through diligent studies, the present inventors found that by forming a surface layer containing Au and Cr on a surface of a Ti base, and controlling a ratio represented by (Au coating amount)/(Cr coating amount) being 10 or more, a layer containing Au can be formed on Ti strongly and uniformly, and corrosion resistance and durability required for a fuel cell separator in the chlorine containing solution can be obtained.

To achieve the above object, the present invention provides a material for fuel cell separator, comprising: a Ti base; a surface layer containing Au and Cr formed on a surface of the Ti base; and an intermediate layer containing Ti, O, Cr, and less than 20 atomic % of Au present between the Ti base and the surface layer, wherein a thickness of an area containing 65 atomic % or more of Au being 1.5 nm or more, a maximum concentration of Au being 80 atomic % or more, a coating amount of Au being 9000 to 40000 $ng/cm^2$, a ratio represented by (Au coating amount)/(Cr coating amount) being 10 or more, a coating amount of Cr being 200 $ng/cm^2$ or more, and in the intermediate layer having an area containing 10% or more of Ti, 10% or more of O and 20% or more of Cr being 1 nm or more.

Preferably, the Ti base is formed by coating a Ti coating with a thickness of 10 nm or more on a material other than Ti.

Preferably, the material for fuel cell separator of the present invention is used for a polymer electrolyte fuel cell or a direct methanol fuel cell.

A fuel cell separator of the present invention uses the material for fuel cell separator, wherein a reaction gas flow path and/or a reaction liquid flow path is press-formed on the Ti base, and then the surface layer is formed.

Or, a fuel cell separator of the present invention uses the material for fuel cell separator, wherein the surface layer is formed on the Ti base, and then a reaction gas flow path and/or a reaction liquid flow path is press-formed.

A fuel cell stack of the present invention uses the material for fuel cell separator or the fuel cell separator.

A method of producing the material for fuel cell separator of the present invention comprises dry film-forming Cr on the surface of the Ti base, and dry film-forming Au thereon.

Preferably, the dry film-forming is sputtering.

According to the present invention, the Au containing layer can be formed strongly and uniformly on Ti, and adhesion and corrosion resistance properties required for the fuel cell separator in the chlorine containing solution can be ensured.

BRIEF DESCRIPTION OF THE DRAWINGS

FIG. 1 shows a structure of a material for fuel cell separator according to the embodiment of the present invention;

FIG. 2 shows an XPS analysis of a section of the material for fuel cell separator of the sample in Example 1;

FIG. 3 is a section view of a fuel cell stack (single cell) according to the embodiment of the present invention;

FIG. 4 is a plan view showing the structure of the separator according to the embodiment of the present invention;

FIG. 5 is a plan view showing the structure of the gasket according to the embodiment of the present invention;

FIG. 6 is a section view of the flat type fuel cell stack according to the embodiment of the present invention; and FIG. 7 is a plan view showing a structure of the flat type fuel cell separator.

DESCRIPTION OF THE PREFERRED EMBODIMENTS

Embodiments of the material for fuel cell separator according to the present invention will be described below. The symbol "%" herein refers to atomic (at) %, unless otherwise specified.

The term "fuel cell separator" herein refers to a fuel cell separator which has electrical conductivity, connects each single cell electrically, collects energy (electricity) produced on each single cell, and has flow paths for fuel gas (fuel liquid) or air (oxygen) that is provided to each single cell. The separator is also referred to as an interconnector, a bipolar plate or a current collector.

Accordingly, the fuel cell separator includes a separator having concave-convex flow paths formed on a surface of a plate-like base, as well as a separator having flow paths with open holes for a gas or methanol formed on a surface of a plate-like base, such as the above-mentioned passive type DMFC separator, which will be described below for detail.

As shown in FIG. 1, a material for fuel cell separator according to an embodiment of the present invention includes a Ti base 2, an intermediate layer 2a formed on the surface of the Ti base 2, and a surface layer 6 formed on the intermediate layer 2a.

<Ti Base>

The material for fuel cell separator requires corrosion resistance and electrical conductivity, and the base requires corrosion resistance. So, a titanium material having good corrosion resistance is used as the base.

The Ti base may be solid titanium, or may be a material other than Ti having a Ti coating thereon with a thickness of 10 nm or more. Examples of the material other than Ti include stainless steel, aluminum and copper. When Ti is coated on the surface of the material, lower corrosion resistance of stainless steel, aluminum or copper as compared with titanium can be improved. Corrosion resistance can be improved, only if Ti is coated with a thickness of 10 nm or more.

There is no special limitation about the material of the Ti base 2, as long as titanium is used. Also, there is no special limitation about the shape of the Ti base 2, as long as Cr and gold can be sputtered. In terms of press-molding it to a separator shape, it is preferable that the Ti base is in a plate-like shape and the Ti base has a total thickness of 10 μm or more.

O (oxygen) contained in the intermediate layer 2a is naturally produced, when the Ti base 2 is left in the air. Also, O may be produced positively under oxidizing atmosphere.

The Ti concentration is detected using an XPS detector as described later. The concentration of each element (atomic %) is analyzed based on the total 100% of the designated element. A 1 nm thickness from an outermost surface of the material for fuel cell separator refers to an abscissa axis (thickness direction) distance (distance by $SiO_2$ conversion) of the chart of the XPS analysis.

<Surface Layer>

On the Ti base 2, a surface layer 6 containing Cr and Au is formed. The surface layer 6 where the Au concentration is 65% or more has a thickness of 1.5 nm or more. The surface layer is for adding the properties (corrosion resistance, electrical conductivity etc.) belonging to Au and hydrogen embrittlement resistance to the Ti base.

Cr has characteristics that a) Cr is easily bonded to oxygen, b) a Cr—Au alloy is formed and c) Cr absorbs less hydrogen. The above-described functions are added to the surface layer, and an intermediate layer is formed to improve binding property between the surface layer and the Ti base.

Furthermore, Cr is more oxidizable than Au based on the potential-pH diagram, and absorb less hydrogen. Utilizing such properties, Cr is used as a constituent element of the intermediate layer.

The surface layer can be confirmed by the XPS as described later. By the XPS analysis, the surface layer is defined as a section containing Au (20% or more) and Cr from the outermost layer to the bottom layer and positioned above of the intermediate layer thereunder. The thickness of the surface layer is desirably 5 to 100 nm. If the thickness of the surface layer is less than 5 nm, the corrosion resistance required for the fuel cell separator on the Ti base may not be ensured. The thickness of the surface layer is more desirably 7 nm or more, and further desirably 10 nm or more.

In addition, Cr and Au may be heat treated after film formation. By the heat treatment, oxidation and diffusion may proceed to decrease the concentration of Au on the surface layer. However, when the thickness of the area containing 65% or more of Au is 1.5 nm or more, titanium is not diffused on the surface layer, thereby serving as the surface layer.

If the thickness of the surface layer exceeds 100 nm, gold may not be saved, thereby increasing the costs.

If the thickness of the area containing 65% or more of Au in the surface layer is less than 1.5 nm, the corrosion resistance required for the fuel cell separator may not be ensured.

In addition, the maximum concentration of Au in the surface layer 6 should be 80% or more. If the maximum concentration of Au is less than 80%, the properties belonging to Au such as corrosion resistance and conductivity, and hydrogen brittleness resistance will not be sufficiently added to the Ti base.

Also, an Au single layer may be formed on the outermost surface of the surface layer 6. The Au single layer includes almost 100% of an Au concentration according to the XPS analysis.

In addition, a composition region (noble metal region) mainly comprising Cr may be formed on the intermediate layer side of the surface layer 6.

<Intermediate Layer>

An intermediate layer 2a comprising Ti, O, Cr and less than 20% of Au is provided between the surface layer (or the Au single layer) 6 and the Ti base 2.

Generally, the Ti base has an oxide layer thereon, and the Au (containing) layer which is less oxidized is therefore difficult to be formed directly on the Ti surface. On the other hand, the above-mentioned metal is more easily oxidized than Au, and form an oxide with O atoms in Ti oxide on the Ti base, which is considered to be bond strongly to the surface of the Ti base.

In addition, the above-mentioned metal absorbs less hydrogen. In light of these points, when the conductive layer containing Au (the above-mentioned surface layer or the Au single layer) has a thickness of 10 nm or less, the intermediate layer is formed by Ti, O and Cr, resulting in the more durable separator material compared with the conventional intermediate layer made simply by Ti, Zr, Hf, V, Nb, Ta, Cr, Mo, W and the like.

Preferably, the intermediate layer contains no Au. If the intermediate layer contains 20% or more of Au, the adhesion property is decreased. In order to provide the intermediate layer containing less than 20% of Au, a target of single Cr or a target of Cr—Au alloy containing low concentration of Au is preferably used to sputter on the Ti base.

The coating amount of Cr is 200 $ng/cm^2$ or more. The intermediate layer has a thickness of 1 nm or more containing 10% or more of Ti, 10% or more of O and 20% or more of Cr. In this case, when the section of the material for fuel cell separator is analyzed by XPS, the thickness of the area containing 10% or more of Ti, 10% or more of O, 20% or more of Cr and 20% or more of Au is 1 nm or more. The upper limit of the thickness of the intermediate layer having the composition is not limited, but it is preferably 100 nm or less in terms of the costs.

If the coating amount of Cr is less than 200 $ng/cm^2$, the adhesion property may become poor.

Here, a depth profile of the XPS (X-ray photoelectron spectroscopy) analysis is measured and the concentrations of Au, Ti, O and Cr are analyzed to determine the layer structure of the sputter layer. The concentration of each element is analyzed using the XPS based on the total 100% of the designated element. The term "1 nm distance" in the thickness direction in the XPS analysis refers to the abscissa axis distance (distance by $SiO_2$ conversion) of the chart of the XPS analysis.

The lower limit of Ti and O is set to 10% and the lower limit of Cr is set to 20%, because the region containing less than 20% of Cr is near the surface of the Ti base, the region containing less than 10% of Ti is near the surface layer, and in the region containing less than 10% of O, Cr and Ti do not form oxides with O atoms sufficiently such that it does not function as the intermediate layer. If the intermediate layer is less than 1 nm, Cr is thin and the Ti base is widely contacted with Au, whereby the adhesion property of the surface layer may become poor.

In the material for fuel cell separator of the present invention, the coating amount of Au should be 9000 to 40000 $ng/cm^2$.

If the coating amount of Au is less than 9000 $ng/cm^2$, the corrosion resistance required for the fuel cell separator may not be ensured.

On the other hand, the coating amount of Au should be less than 40000 $ng/cm^2$ in terms of save gold. A ratio represented by (Au coating amount)/(Cr coating amount) is 10 or more. If the ratio represented by (Au coating amount)/(Cr coating amount) is less than 10 when the coating amount of Au is less than 40000 $ng/cm^2$, Cr may be partly exposed to the surface of the sputter film, contact resistance is increased after a corrosion resistance test using a chlorine containing corrosion solution, and a relatively large amount of Cr is undesirably eluted.

The upper limit of the ratio represented by (Au coating amount)/(Cr coating amount) is not especially limited. If the ratio becomes too high, the radio of Cr is decreased and the adhesion property of the surface layer is not assuredly improved by Cr. Therefore, the ratio is preferably 100 or less. If the ratio becomes too high, Au is coated more than needed, thereby increasing the costs. For this reason, the ratio is desirably 50 or less, more desirably 30 or less, further desirably 20 or less.

In the present invention, an oxide layer containing less than 50% of Ti and 20% or more of O is desirably formed at a thickness of less than 100 nm between the Ti base and the surface layer 6. A part of the oxide layer may be overlapped with the area of the intermediate layer.

When the oxide layer is present, the titanium base is prevented from being brittle when a sequential electric generation test of the fuel cell is performed. An area containing less than 50% of Ti, where the amount of Ti is less than half of the total, does not constitute the Ti base. As the oxide film is present on the surface of the Ti base, the oxide layer will be from the area containing less than 50% of Ti to the surface layer. The area containing 20% or more of O is defined as the oxide layer. This is because when the O (oxygen) concentration of the oxide layer is less than 20%, the titanium base will be brittle by the sequential electric generation test of the fuel cell, and the durability of the material for fuel cell separator becomes poor.

However, if the thickness of the oxide layer exceeds 100 nm, the adhesion and the electric conductivity may be decreased. On the other hand, if the oxide layer is thin, the titanium base will be brittle by the sequential electric generation test of the fuel cell, and the durability of the material for fuel cell separator may be poor. Therefore, the thickness of the oxide layer is desirably 5 nm or more, more desirably 10 nm or more.

Preferably, the surface layer has the gradient composition where the concentration of Au is increased from the bottom layer to the upper layer. The concentration (at %) of Au can be determined by the XPS analysis as described above. The thickness of the surface layer is the real distance of the scanning distance in the XPS analysis.

When the surface layer has the gradient composition, the concentration of Cr that is easily oxidized than Au is increased in the bottom layer of the surface layer, which is strongly bonded to the surface of the Ti base, and the properties of Au strongly affects on the upper layer of the surface layer to improve corrosion resistance and durability.

<Production of the Material for Fuel Cell Separator>

The intermediate layer in the material for fuel cell separator can be formed by sputtering Cr as the target to the base without removing the surface Ti oxide film on the Ti base, to bind Cr to O in the surface Ti oxide film. Alternatively, the intermediate layer can also be formed by sputtering the oxide of Cr(s) as the target after the surface Ti oxide film of the Ti base 2 is removed, or by sputtering Cr as the target under oxidation atmosphere after the surface Ti oxide film of the Ti base 2 is removed.

Upon sputtering, the surface Ti oxide film on the Ti base may be properly removed and reverse sputtering (ion etching) may be conducted in order to clean the surface of the base. The reverse sputtering can be conducted by, for example, irradiating the base with argon gas at an argon pressure of about 0.2 Pa at RF output of about 100 W.

Au atoms may be incorporated into the intermediate layer by sputtering Au to form the surface layer as described below. Alternatively, the alloy target containing Cr and Au may be sputtered to the surface of the Ti base.

The surface layer can be formed by sputtering Cr on the Ti base as described above, and then sputtering Au on the layer of Cr. In this case, the sputter particles have high energy. Even if only the layer of Cr is formed on the surface of the Ti base, sputtered Au can enter into the layer of Cr to provide the surface layer. Also, in this case, the surface layer has the gradient composition where the concentration of Au is increased from the bottom layer to the upper layer.

Alternatively, first, the alloy target containing Cr and Au wherein Au at low concentration may be sputtered to the surface of the Ti base, and then the alloy target containing Cr and Au wherein Au at high concentration may be sputtered thereto.

According to the material for fuel cell separator embodiments of the present invention, the Au containing layer can be formed on the Ti strongly and uniformly and this layer has conductivity, corrosion resistance and durability, which is suitable to a material for fuel cell separator. In addition, according to the embodiments of the present invention, the Au containing layer is sputtered to be uniform, which is smoother than that formed by gold wet plating, so Au is advantageously saved.

<Fuel Cell Separator>

Then, an example of the fuel cell separator made with the material for fuel cell separator according to the present invention will be described below. The fuel cell separator is made by working the above-mentioned fuel cell separator material into the predetermined shape, and comprises reaction gas flow paths or reaction liquid flow paths (channels or openings) for flowing a fuel gas (hydrogen), a fuel liquid (methanol), air (oxygen), cooling water and the like.

<Layered Type (Active Type) Fuel Cell Separator>

FIG. 3 shows a section of a single cell of the layered type (active type) fuel cell. In FIG. 3, current collector plates 140A and 140B are disposed outside of a separator 10, as described later. Generally, when the single cells are layered to form a stack, only a pair of the current collector plates is disposed on both ends of the stack.

The separator 10 has electrical conductivity, contacts with MEA as described later to collect current, and electrically connects respective single cells. In addition, as described later, the separator 10 has channels as flow paths for flowing a fuel gas or air (oxygen).

In FIG. 3, MEA (Membrane Electrode Assembly) 80 is made by laminating an anode electrode 40 and a cathode electrode 60 on both sides of a polymer electrolyte membrane 20. On the surfaces of the anode electrode 40 and the cathode electrode 60, an anode side gas diffusion layer 90A and a cathode side gas diffusion layer 90B are laminated, respectively. The MEA herein may be a laminate including the gas diffusion layers 90A and 90B. When the gas diffusion layers are formed on the surfaces of the anode electrode 40 and the cathode electrode 60, the laminate of the polymer electrolyte membrane 20, the anode electrode 40 and the cathode electrode 60 may be referred to as the MEA.

On both sides of the MEA 80, separators 10 are disposed facing to the gas diffusion layers 90A and 90b, and sandwich the MEA 80. Flow paths 10L are formed on the surfaces of the separators 10 at the side of the MEA 80, and gas can be enter and exit into/from an internal spaces 20 surrounded by gaskets 12, the flow paths 10L and the gas diffusion layer 90A (or 90B) as described later.

A fuel gas (hydrogen or the like) flows into the internal spaces 20 at the anode electrode 40, and an oxidizing gas (oxygen, air or the like) flows into the internal spaces 20 at the cathode electrode 60 to undergo electrochemical reaction.

The outside peripherals of the anode electrode 40 and the gas diffusion layer 90A are surrounded by a frame-like seal member 31 having the almost same thickness as the total thickness of the anode electrode 40 and the gas diffusion layer 90A. A substantially frame-like gasket 12 is inserted between the seal member 31 and the peripheral of the separator 10 such that the separator is contacted with the gasket 12 and the flow paths 10L are surrounded by the gasket 12. The current collector plate 140A (or 140B) is laminated on the outer surface (opposite surface of the MEA 80 side) of the separator 10 such that the separator 10 is contacted with the collector plate 140A (or 140B), and a substantially frame-like seal member 32 is inserted between the current collector plate 140A (or 140B) and the peripheral of the separator 10.

The seal member 31 and the gasket 12 form a seal to prevent the fuel gas or the oxidizing gas from leaking outside the cell. When a plurality of the single cells are laminated to form a stack, a gas flows into a space 21 between the outside of the separator 10 and the current collector plate 140A (or 140B); the gas being different from that flowing into the space 20 (When the oxidizing gas flows into the space 20, hydrogen flows into the space 21). Therefore, the seal member 32 is also used as the member for preventing the gas from leaking outside the cell.

The fuel cell includes the MEA 80 (and the gas diffusion layers 90A and 90B), the separator 10, the gasket 12 and the current collectors 140A and 140B. A plurality of the fuel cells are laminated to form a fuel cell stack.

Then, the structure of the separator 10 will be described referring to plan view of FIG. 4. The separator 10 is press-formed in a rectangular shape from the material for fuel cell separator of the present invention. At the left upper edge (upper side) of the separator 10, a fuel gas inlet hole 10x is provided. At the right lower edge (lower side) of the separator 10, a fuel gas outlet hole 10y is provided.

In addition, a plurality of straight flow path channels 10L are press-formed to extend parallel in a direction from the upper side to the lower side of the separator 10 (from a top to a bottom direction in FIG. 4). The straight flow path channels 10L produce parallel gas flows.

According to the embodiment, beginning and ending of the straight flow path channels 10L do not reach the outer edges of the separator 10. The peripheral of the separator 10 has a flat part where no straight flow path channels 10L are formed. According to the embodiment, although the straight flow path channels 10 abutted are disposed at even intervals, they may be disposed at uneven intervals.

In addition, positioning holes 10f are opened at opposing side edges (right and left sides) of the separator 10.

The flow path channels may be straight or curve, e.g. flexure, S-curve, and may not always be parallel to each other.

In terms of easy formation of the flow path channels, they are preferably parallel straight.

The separator 10 has a thickness of preferably 10 μm or more in terms of the press formability and less than 200 μm in terms of the costs.

Then, the structure of the gasket 12 will be described referring to a plan view of FIG. 5.

The gasket 12 is a sheet, for example, made with TEF-LON(trademark), and has a shape of a rectangular frame where an outer edge has almost the same size of that of the separator 10. Its inner edge has an almost rectangular shape surrounding the fuel gas inlet hole 10x, the outlet hole 10y and the straight flow path channels 10L. The fuel gas inlet hole 10x, the outlet hole 10y and the straight flow path channels 10L are communicated within the internal space of the gasket 12.

Positioning holes 12f are opened at opposing side edges (right and left sides) of the gasket 12. The gasket 12 is laminated to the separator 10 so that the positioning holes 10f and the gasket 12 are overlapped to establish the relative position.

Examples of the material of the gasket 12 include TEF-LON(trademark) having corrosion resistance and heat resistance at 80 to 90° C. that is an operating temperature of the fuel cell, a metal plate on which a layer of noble metal is formed having corrosion resistance and heat resistance (a sheet of titanium, stainless steel, aluminum or the like) or a carbon material. The thickness of the gasket 12 depends on the irregularity of the separator 10, but should have the channel height (the height difference between the frame and the irregularity) in the separators or more. For example, when the separator has the channel height of 0.5 mm, the gasket has the thickness of 0.5 mm.

Then, the shape of the gasket 12 will be described in detail. The upper inner edge 12c of the gasket 12 is disposed at little above of the upper end 10L1 of the straight flow path channels, and has a space for turning around and changing the direction by 180 degree of the gas flowing along the straight flow path channels 10L. The left end of the upper inner edge 12c extends to outside so that the fuel gas inlet hole 10x of the separator 10 is exposed to the gasket 12.

Similarly, the lower inner edge 12d of the gasket 12 is disposed at somewhat below of the lower end L2 of the straight flow path channels, and has a space for turning around and changing the direction by 180 degree of the gas flowing along the straight flow path channels 10L. The right end of the lower inner edge 12d extends to outside so that the fuel gas outlet hole 10y of the separator 10 is exposed to the gasket 12.

A piece of a dividing member 12e1 of the upper inner edge 12c extends to inside at a position adjacent to the fuel gas inlet hole 10x. A piece of another dividing member 12e2 of the upper inner edge 12c extends to inside disposed right at a predetermined distance from the dividing member 12e1. The ends of the dividing members 12e1 and 12e2 are contacted with the upper end (corresponds to beginning or terminal end) 10L1 of the straight flow path channels.

Similarly, a piece of a dividing member 12e3 of the lower inner edge 12d extends to inside disposed right at a predetermined distance from the opposed position of the dividing member 12e1. A piece of another dividing member 12e4 of the lower inner edge 12d extends to inside at a position adjacent to the fuel gas outlet hole 10y and disposed right at a predetermined distance from the opposed position of the dividing member 12e2. The ends of the dividing members 12e3 and 12e4 are contacted with the lower end (corresponds to beginning or terminal end) 10L2 of the straight flow path channels.

The dividing members 12e1 to 12e4 extending from the facing inner edges 12c and 12d of the gasket 12 are disposed in order from the left side in FIG. 5: the dividing members 12e1 (the upper inner edge 12c), 12e3 (the lower inner edge 12d), 12e2 (the upper inner edge 12c), and 12e4 (the lower inner edge 12d).

Thus, the dividing members extending from the facing inner edges of the gasket 12 are disposed in a staggered formation so that the gas flow paths flowing along the straight flow path channels 10L turn around near the dividing members to form a serpentine flow paths.

Specifically, the gas introduced from the fuel gas inlet hole 10x into the separator 10 flows down along the straight flow path channels 10L as shown in FIG. 5. The dividing member 12e3 is contacted with the lower ends of the flow path channels 10L, and inhibits the flows along the flow path channels 10L. In addition, the flow traversing the flow path channels 10L is originally inhibited. The flow path channels 10L abutted the dividing member 12e3 function as an embankment for inhibiting the gas flow both in horizontal taking a short cut (right direction in FIG. 5) and longitudinal directions. So, the gas flow turns around and changes the direction by 180 degree near the dividing member 12e3, and flows upward along the straight flow path channels 10L. Then, the dividing members 12e1 and e2 inhibit the short cut flow in the horizontal direction as well. The gas flow turns around near the dividing member 12e2, and flows downward along the straight flow path channels 10L. In a similar fashion, the gas flow turns around near the dividing member 12e4, and flows along the straight flow path channels 10L. The right inner edge (side edge) of the gasket 12 inhibits the short cut flow of the gas flow, which turns around and is exhausted from the fuel gas outlet hole 10y along the straight flow path channels 10.

The number of the flow path channels abutted one dividing member depends on the size of the separator and the size (width) of the flow path channels, and therefore is not especially limited. If too many flow path channels are abutted, less flow path channels contributes to the gas flow. Preferably, 1 to 3 flow path channels are used.

As described above, the serpentine gas flow paths are provided in the gasket by means of the shape of the easily-workable gasket. As such, there is no need to form any complex flow paths in the separator, the shape of the flow paths in the separator can be simple, and the gas flow can be improved without compromising the productivity to enhance the fuel cell power generation properties. In other words, the parallel gas flow in the separator can be changed to the serpentine gas flow by means of the shape of the gasket.

In this regard, any shape of the flow path channels to be serpentine may be used, and the shape of the flow path channels is not limited.

The layered type (active type) fuel cell shown in FIG. 3 can be applied not only to the above-mentioned fuel cell using hydrogen as the fuel, but also for the DMFC using methanol as the fuel.

<Flat Type (Passive Type) Fuel Cell Separator>

FIG. 6 shows a section of a single cell of the flat type (passive type) fuel cell. In FIG. 3, current collector plates 140A and 140B are disposed outside of a separator 10, as described later. Generally, when the single cells are layered to form a stack, only a pair of the current collector plates is disposed on both ends of the stack.

In FIG. 6, the structure of the MEA 80 is the same as that in FIG. 5, so the same components are designated by the same symbols and the descriptions thereof are omitted. (In FIG. 6, the description of the gas diffusion layers 90A and 90B is omitted, but the MEA 80 may have the gas diffusion layers 90A and 90B.)

In FIG. 6, the separator 100 has electrical conductivity, collects electricity upon contact with the MEA, and electrically connects each single cell. As described later, holes are formed on the separator 100 for flowing a fuel liquid and air (oxygen).

The separator 100 has a stair 100s on the center of an elongated tabular base so as to make the section crank shape, and includes an upper piece 100b disposed upper via the stair 100s and a lower piece 100a disposed below via the stair 100s. The stair 100s extends vertically in the longitudinal direction of the separator 100.

A plurality of the separators 100 are arranged in the longitudinal direction, spaces are provided between the lower pieces 100a and the upper pieces 100b of the abutted separators 100, and the MEAs 80 are inserted into the spaces. The structure that the MEA 80 is sandwiched between two separators 100 constitutes a single cell 300. In this way, a stack that a plurality of the MEAs 80 are connected in series via the separators 100 is provided.

FIG. 7 shows a top view of the separators 100. A plurality of holes 100h are formed on the lower pieces 100a and the upper pieces 100b, and become reaction gas flow paths for oxygen (air) and methanol reaction liquid flow paths.

In the stack, when air (oxygen) flows from above as shown in FIG. 6, oxygen passes through the holes 100h of the separators 100 and is contacted with the cathode electrodes 60 of the MEAs 80 for reaction. When methanol flows from below as shown in FIG. 6, methanol passes through the holes 100h of the separators 100 and is contacted with the anode electrodes 40 of the MEAs 80 for reaction. Methanol is provided from a lower tank (methanol cartridge) 200.

The flat type (passive type) fuel cell shown in FIG. 6 can be applied not only to the above-mentioned DMFC using methanol as the fuel, but also for the fuel cell using hydrogen as the fuel. The shape and the number of the openings of the flat type (passive type) fuel cell separator are not limited, the openings may be not only holes but also slits, or the whole separator may be net.

In the fuel cell separator of the present invention, reaction gas flow paths and/or reaction liquid flow paths are preferably press-formed on the Ti base in advance. In this way, there is no need to form the reaction gas flow paths (reaction liquid flow paths) in the later process, the Ti base is press-formed before the intermediate layer, the surface layer and the like are formed, whereby the reaction flow paths (reaction liquid flow paths) are easily formed. Thus, the productivity is improved.

In the fuel cell separator of the present invention, on the material for fuel cell separator comprising the surface layer or the Au single layer on the surface of the Ti base, the reaction gas flow paths and/or the reaction liquid flow paths may be press-formed later. According to the material for fuel cell separator of the present invention, since the surface layer or the Au single layer strongly adheres to the surface of the Ti base, the reaction gas flow paths (reaction liquid flow paths) can be press-formed even after the layer formation without delaminating the layer. Thus, the productivity is improved.

In order to press-form the reactive gas flow paths (reaction liquid flow paths), it is preferable that the Ti base of the material for fuel cell separator has a thickness of 10 μm or more. The upper limit of the thickness of the Ti base is not limited, but it is preferably 200 μm or less in terms of the costs.

<Fuel Cell Stack>

The fuel cell stack of the present invention is obtained by using the material for fuel cell separator of the present invention or the fuel cell separator of the present invention.

The fuel cell stack has a plurality of cells connected in series where electrolyte is sandwiched between a pair of electrodes. The fuel cell separator is inserted between the cells to block the fuel gas or air. The electrode contacted with the fuel gas ($H_2$) is a fuel electrode (anode), and the electrode contacted with air ($O_2$) is an air electrode (cathode).

Non-limiting examples of the fuel cell stack have been described referring to FIGS. 3 and 6.

EXAMPLES

<Sample Preparation>

An industrial pure titanium sheet (JIS 1st class) having a thickness of 100 μm was used as the Ti base and was pre-treated with FIB (focused ion beam processing). The Ti base was observed with energy-dispersive X-ray spectroscopy (EDX) of FE-TEM (field-emission transmission electron microscopy). It was identified that a titanium oxide layer having a thickness of about 10 nm was already formed on the surface of the Ti base.

In some examples, the Ti base (Ti coated base) was used by coating a Ti coating with a predetermined thickness as shown in Tables 1 on an industrial pure stainless steel sheet (SUS316L) having a thickness of 100 µm or a pure copper (C1100) having a thickness of 100 µm Ti was coated with vacuum deposition using an electron beam vapor deposition system (manufactured by ULVAC-PHI, Inc., MB05-1006).

Then, a Cr was formed on the surface of the titanium oxide film of the Ti base using a sputtering method to have the predetermined target thickness. A pure Cr target was used. Then, an Au layer was formed thereon using the sputtering method to have the predetermined target thickness. A pure Au target was used.

The target thickness was determined as follows. First, the object (e.g. Cr and Au) was formed on the titanium base by sputtering. The actual thickness was measured by a fluorescent X-ray layer thickness meter (SEA5100 manufactured by Seiko Instruments, collimator 0.1 mm phi(diameter)), and the sputter rate (nm/min) under this sputtering condition was determined. Based on the sputter rate, the sputtering time for providing the thickness of 1 nm was calculated, and the sputtering was performed under this condition.

Cr and Au were sputtered using the sputtering apparatus manufactured by ULVAC-PHI, Inc., under the following conditions: output of DC50 W, and argon pressure of 0.2 Pa.

<Layer Structure Measurement>

The resultant sample was measured for the depth profile of the XPS (X-ray photoelectron spectroscopy) analysis and the concentrations of Au, Ti, O and Cr were analyzed to determine the layer structure of the sputter layer. As the XPS apparatus, 5600MC manufactured by ULVAC-PHI, Inc., was used at ultimate vacuum of $6.5 \times 10^{-8}$ Pa, excitation source of monochromatic AIK, output of 300 W, detected area of 800 µm diameter, incident angle of 45 degree, take-off angle of 45 degree without an electron flood gun under the following sputtering conditions:

Ion species: Ar+
Acceleration voltage: 3 kV
Sweep area: 3 mm×3 mm
Rate: 2.0 nm/min ($SiO_2$ conversion)

The concentration (at %) of each element was analyzed using the XPS based on the total 100% of the designated element. The term "1 nm distance" in the thickness direction in the XPS analysis refers to the abscissa axis distance (distance by $SiO_2$ conversion) of the chart of the XPS analysis.

FIG. 2 shows the actual XPS image of the section of the sample in Example 1.

On the surface of the Ti base 2, the surface layer 6 including Cr and Au is formed. It turns out that the intermediate layer 2a comprising Ti, O, Cr and less than 20% of Au with a thickness of 1 nm or more is provided between the Ti base 2 and the surface layer 6.

It also turns out that an oxide layer containing less than 50% of Ti and 20% or more of O is formed at a thickness of less than 100 nm at the Ti base 2 side from the surface layer 6.

According to the present invention, the concentrations of Ti, O and the like are specified to define the intermediate layer. Consequently, the boundary of the intermediate layer is determined by the concentrations of Ti and O as a matter of convenience, a layer different from the intermediate layer and Ti base may be interposed between the intermediate layer and the upper and lower layers (e.g. Ti base 2).

<Sample Preparation>

To titanium bases (pure Ti and Ti coated materials) having initial surface Ti oxide films having different thicknesses, Cr film and Au film were sputtered by changing target thicknesses to provide samples in Examples 1 to 11.

As Comparative Example 9, a sample including a sputtered Au film having a reduced thickness of 4 nm was provided.

As Comparative Examples 10, 14 and 15, samples were provided so that the Au coated amount/Cr coated amount was less than 10.

As Comparative Example 11, a sample including a sputtered Cr film having a reduced thickness of 0.25 nm was provided.

As Comparative Example 12, a sample was provided by heating under atmosphere (120° C.×12 hours) after sputtering.

As Comparative Example 13, a sample was provided by heating the base (300° C.) upon sputtering.

<Evaluation>

Each sample was evaluated as follows:

A. Adhesion Property

The uppermost surface (the surface layer) of each sample was scribed a grid pattern at 1 mm intervals. The adhesion tape was adhered thereto. Each sample piece was bent at 180 degree and was then returned to the original position. The tape on the bent portion was rapidly and strongly peeled off. Thus, the peeling test was performed.

When no peeling-off occurred, the evaluation was good. When any peeling-off was recognized by visual inspection, the evaluation was bad.

B. Contact Resistance

Contact resistance was measured by applying a load onto the entire surface of the sample. A carbon paper was laminated on each side of a 40×50 mm sheet sample respectively. A Cu/Ni/Au plate was laminated on each outside of the carbon paper respectively. The Cu/Ni/Au plate was a material comprising a copper plate having a thickness of 10 mm, Ni base plating having a thickness of 1.0 µm on the copper plate, and Au plating having a thickness of 0.5 µm on the Ni layer. The surface of the Au plating of the Cu/Ni/Au plate was disposed to be contacted with the carbon paper.

On the outer surface of each Cu/Ni/Au plate, a TEFLON™ plate was disposed respectively. To the outside of each TEFLON™ plate, a load of 10 kg/cm² was applied by a load cell in a compression direction. Under the condition, a constant current having a current density of 100 mA/cm² was applied between two Cu/Ni/Au plates to measure electric resistance there between by four terminal method.

Also, the contact resistance was measured before and after each sample tested under the following two conditions:

Condition 1: Immersion test of each sample into a sulfuric acid solution (bath temperature of 90° C., sulfuric acid concentration of 0.5 g/L, immersion time of 240 hours, liquid amount of 1000 cc)

Condition 2: Immersion test of each sample into a (chlorine containing solution):sulfuric acid (0.5 g/L)+sodium chloride (Cl: 10 ppm) solution (bath temperature of 90° C., immersion time of 240 hours, liquid amount of 1000 cc)

C. Metal Elution Amount

The metal elution amount was evaluated by ICP (inductively-coupled plasma) optical emission spectrometry of all metal concentrations (mg/L) in each test liquid after the tests under the above-described conditions 1 to 2.

Typical properties needed for the fuel cell separators are two: low contact resistance (10 mΩ·cm² or less) and corrosion resistance under the usage environment (low contact resistance and no toxic ion elution after the corrosion resistance test).

Tables 1 and 2 show the results obtained. Presence of the intermediate layer and the oxide layer were confirmed by determining the percentages of respective components from actual XPS images of respective sample sections.

D. Coated Amount

The coated amount was evaluated by acid decomposition/ICP (inductively-coupled plasma) optical emission spectrometry. Specifically, a 50 mm×50 mm sample was dissolved in a fluonitric acid solution to analyze the coated amounts of Au and Cr. Five samples were analyzed per condition. Table 1 shows an average value of five measurement results.

TABLE 1

| | | Ti base | | | | | |
|---|---|---|---|---|---|---|---|
| | | Type | Initial oxide film thickness [nm] | Au thickness [nm] | Cr thickness [nm] | Heating under atmosphere after sputtering | Heating base upon sputtering | Adhesion property of coated film |
| Example | 1 | Pure Ti | 10 | 5.00 | 1.00 | No | No | Good |
| | 2 | Pure Ti | 10 | 10.00 | 1.00 | No | No | Good |
| | 3 | Pure Ti | 10 | 10.00 | 2.00 | No | No | Good |
| | 4 | Pure Ti | 10 | 30.00 | 1.00 | No | No | Good |
| | 5 | Pure Ti | 10 | 30.00 | 7.00 | No | No | Good |
| | 6 | Pure Ti | 10 | 10.00 | 2.50 | No | No | Good |
| | 7 | Pure Ti | 10 | 5.00 | 0.50 | No | No | Good |
| | 8 | Pure Ti | 3 | 5.00 | 1.00 | No | No | Good |
| | 9 | Pure Ti | 100 | 5.00 | 1.00 | No | No | Good |
| | 10 | Ti coated (SUS) | 2 | 5.00 | 1.00 | No | No | Good |
| | 11 | Ti coated (Cu) | 2 | 5.00 | 1.00 | No | No | Good |
| Comp-Example | 9 | Pure Ti | 10 | 4.00 | 1.00 | No | No | Good |
| | 10 | Pure Ti | 10 | 5.00 | 3.00 | No | No | Good |
| | 11 | Pure Ti | 10 | 5.00 | 0.25 | No | No | Bad |
| | 12 | Pure Ti | 10 | 5.00 | 1.00 | 120° C. × 12 hours | No | Good |
| | 13 | Pure Ti | 10 | 5.00 | 1.00 | No | 300° C. | Good |
| | 14 | Pure Ti | 10 | 10.00 | 10.00 | No | No | Good |
| | 15 | Pure Ti | 10 | 10.00 | 3.00 | No | No | Good |
| Target | | | | | — | | | Good |

| | | Coated amoount at one side [ng/cm2] | | Thickness of area containing 65% or more of Au [nm] | Maximum Au concentration [wt %] | Au coated amount/ Cr coated amount | Thickness of intermediate layer [nm] | Thickness of oxide layer [nm] |
|---|---|---|---|---|---|---|---|---|
| | | Au | Cr | | | | | |
| Example | 1 | 9650 | 720 | 2 | 99 | 13.4 | 2 | 8.8 |
| | 2 | 19300 | 720 | 7 | 97 | 26.8 | 2 | 8.8 |
| | 3 | 19300 | 1440 | 7 | 96 | 13.4 | 2 | 8.8 |
| | 4 | 57900 | 720 | 27 | 96 | 80.4 | 5 | 8.8 |
| | 5 | 57900 | 5040 | 27 | 96 | 11.5 | 5 | 8.8 |
| | 6 | 19300 | 1800 | 27 | 96 | 10.7 | 2 | 8.8 |
| | 7 | 9650 | 360 | 2 | 85 | 26.8 | 2 | 8.8 |
| | 8 | 9650 | 720 | 2 | 99 | 13.4 | 2 | 2.5 |
| | 9 | 9650 | 720 | 2 | 98 | 13.4 | 2 | 97 |
| | 10 | 9650 | 720 | 2 | 99 | 13.4 | 1 | 2 |
| | 11 | 9650 | 720 | 2 | 99 | 13.4 | 1 | 2 |
| Comp-Example | 9 | 7720 | 720 | 1.5 | 85 | 10.7 | 2 | 8.8 |
| | 10 | 9650 | 2160 | 2 | 97 | 4.5 | 5 | 8.8 |
| | 11 | 9650 | 180 | 2.5 | 88 | 53.6 | <1 | 8.8 |
| | 12 | 9650 | 720 | 1.5 | 70 | 13.4 | 3 | 11.7 |
| | 13 | 9650 | 720 | <1.5 | 82 | 13.4 | 4 | 13.7 |
| | 14 | 19300 | 7200 | 7 | 97 | 2.7 | 5 | 8.8 |
| | 15 | 19300 | 2160 | 7 | 97 | 8.9 | 2 | 8.8 |
| Target | | >=9000 | >=200 | >=1.5 | >=80 | >=10 | >=1 | |

TABLE 2

| | No. | Contact resistance [mΩ·cm²] | | | | Metal elution amount (mg/L) | |
| --- | --- | --- | --- | --- | --- | --- | --- |
| | | Condition 1 | | Condition 2 | | | |
| | | Before test | After test | Before test | After test | Condition 1 | Condition 2 |
| Example | 1 | 10 | 10 | 10 | 10 | <0.01 | <0.01 |
| | 2 | 10 | 10 | 10 | 10 | <0.01 | <0.01 |
| | 3 | 10 | 10 | 10 | 10 | <0.01 | <0.01 |
| | 4 | 10 | 10 | 10 | 10 | <0.01 | <0.01 |
| | 5 | 10 | 10 | 10 | 10 | <0.01 | <0.01 |
| | 6 | 10 | 10 | 10 | 10 | <0.01 | <0.01 |
| | 7 | 10 | 10 | 10 | 10 | <0.01 | <0.01 |
| | 8 | 10 | 10 | 10 | 10 | <0.01 | <0.01 |
| | 9 | 10 | 10 | 10 | 10 | <0.01 | <0.01 |
| | 10 | 10 | 10 | 10 | 10 | <0.01 | <0.01 |
| | 11 | 10 | 10 | 10 | 10 | <0.01 | <0.01 |
| Comp-Example | 9 | 10 | 10 | 10 | 16 | <0.01 | 0.04 |
| | 10 | 10 | 10 | 10 | 18 | <0.01 | 0.03 |
| | 11 | — | — | — | — | — | — |
| | 12 | 10 | 10 | 10 | 17 | <0.01 | 0.04 |
| | 13 | 10 | 10 | 10 | 16 | <0.01 | 0.04 |
| | 14 | 10 | 10 | 10 | 21 | <0.01 | 0.06 |
| | 15 | 10 | 10 | 10 | 13 | <0.01 | 0.02 |
| Target value | | <=10 | <=10 | <=10 | <=10 | <=0.1 | <=0.1 |

As shown in Tables 1 and 2, in each Example where the surface layer and the intermediate layer are present, the thickness of the area containing 65 atomic % or more of Au is 1.5 nm or more, the maximum concentration of Au is 80 atomic % or more, and the ratio represented by (Au coated amount)/(Cr coated amount) was 10 or more, the contact resistance of each sample did not change before and after the corrosion resistance test in the chlorine containing solution, and the adhesion property and the corrosion resistance of each coated film were excellent.

In Comparative Example 9 where the coated amount of Au was less than 9000 ng/cm², the contact resistance was increased after the corrosion resistance test in the chlorine containing solution under the condition 2, a large amount of Cr was eluted under the condition 2, and the corrosion resistance of the coated film was poor.

In Comparative Examples 10, 14 and 15 where the ratio (Au coated amount)/(Cr coated amount) was less than 10, the contact resistance was increased after the corrosion resistance test in the chlorine containing solution under the condition 2, a large amount of Cr was eluted under the condition 2, and the corrosion resistance of the coated film was poor.

In Comparative Example 11 where the coated amount of Cr was less than 200 ng/cm², the adhesion property of the sputter film was decreased, whereby the corrosion resistance could not be evaluated.

In Comparative Example 12 where the maximum concentration of Au was less than 80 atomic % due to heating under atmosphere after sputtering, the contact resistance was increased after the corrosion resistance test in the chlorine containing solution under the condition 2, a large amount of Cr was eluted under the condition 2, and the corrosion resistance of the coated film was poor.

In Comparative Example 13 where the thickness of the area containing 65% or more of Au was less than 1.5 nm, the contact resistance was increased after the corrosion resistance test in the chlorine containing solution under the condition 2, a large amount of Cr was eluted under the condition 2, and the corrosion resistance of the coated film was poor.

REFERENCE SIGNS LIST

2 Ti base
2a intermediate layer
6 surface layer
10, 100 separator
10L, 10LB (gas) flow path
10L1, 10LB1 beginning end of the flow path channel
10L2, 10LB2 terminal end of the flow path channel
12, 12B gasket
12c, 12d inner edge of the gasket
12e1-12e4 dividing member
12eb1-12eb4 gasket flow path
20 polymer electrolyte membrane
40 anode electrode
60 cathode electrode
80 Membrane Electrode Assembly (MEA)
100h hole (of the separator)

What is claimed is:

1. A material for a fuel cell separator, comprising:
   (a) a Ti base;
   (b) a surface layer containing Au and Cr formed on a surface of the Ti base; and
   (c) an intermediate layer containing Ti, O, Cr, and less than 20 atomic % of Au, wherein the intermediate layer is present between the Ti base and the surface layer;
   wherein an area of the surface layer containing 65 atomic % or more of Au has a thickness of 1.5 nm to 27 nm,
      a maximum concentration of Au in the surface layer is 85 to 99 weight %,
      a coating amount of Au is 9000 to 40000 ng/cm²,
      a ratio represented by (Au coating amount)/(Cr coating amount) is 10 to 80.4,
      a coating amount of Cr is 200 ng/cm² to 5040 ng/cm², and the intermediate layer has an area of 1 nm to 5 nm containing 10 atomic % or more of Ti, 10 atomic % or more of 0 and 20 atomic % or more of Cr.

2. The material for a fuel cell separator according to claim 1, wherein the Ti base is formed by coating a Ti coating with a thickness of 10 nm or more on a material other than Ti.

3. A polymer electrolyte fuel cell comprising the material for a fuel cell separator according to claim 1.

4. A direct methanol fuel cell comprising the material for a fuel cell separator according to claim 1.

5. A fuel cell separator comprising the material for a fuel cell separator according to claim 1, wherein a reaction gas flow path and/or a reaction liquid flow path is press-formed on the Ti base, and then the surface layer is formed.

6. A fuel cell separator comprising the material for a fuel cell separator according to claim 1, wherein the surface layer is formed on the Ti base, and then a reaction gas flow path and/or a reaction liquid flow path is press-formed.

7. A fuel cell stack comprising the material for a fuel cell separator according to claim 1.

8. A method of producing the material for a fuel cell separator according to claim 1, comprising:
   dry film-forming Cr on the surface of the Ti base, and
   dry film-forming Au thereon.

9. The method of producing the material for a fuel cell separator according claim 8, wherein the dry film-forming is sputtering.

10. A fuel cell stack comprising the fuel cell separator according to claim 5.

11. A fuel cell stack comprising the fuel cell separator according to claim 6.

* * * * *